Figure 1:
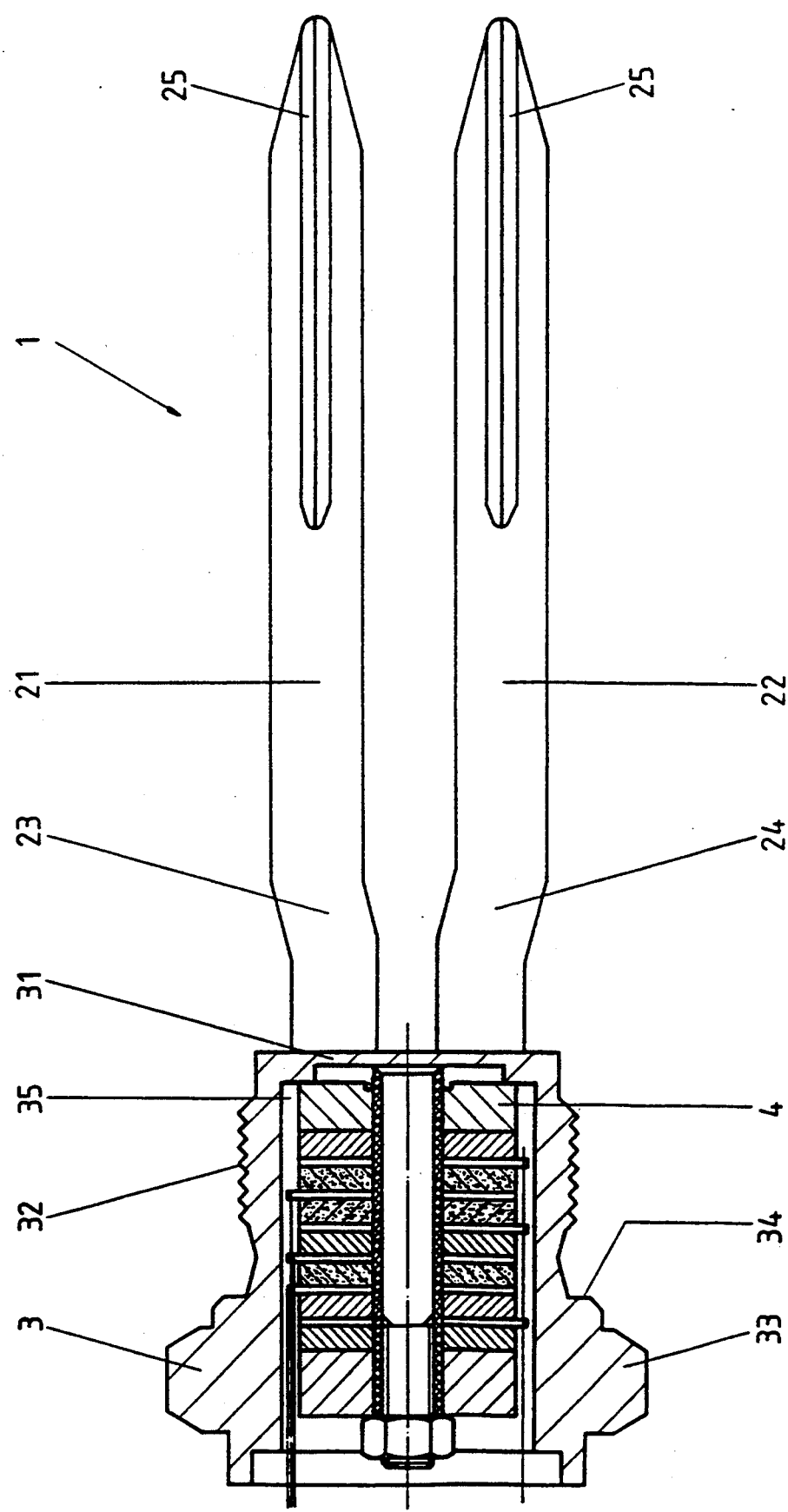

United States Patent [19]

Pfändler

[11] Patent Number: 5,408,168
[45] Date of Patent: Apr. 18, 1995

[54] DEVICE FOR DETERMINING AND/OR MONITORING A PREDETERMINED FILLING LEVEL IN A CONTAINER

[75] Inventor: Martin Pfändler, Maulburg, Germany

[73] Assignee: Endress & Hauser GmbH & Co., Germany

[21] Appl. No.: 969,180
[22] PCT Filed: Jun. 5, 1992
[86] PCT No.: PCT/DE92/00460
§ 371 Date: Mar. 25, 1993
§ 102(e) Date: Mar. 25, 1993
[87] PCT Pub. No.: WO92/21945
PCT Pub. Date: Dec. 10, 1992

[30] Foreign Application Priority Data

Jun. 6, 1991 [DE] Germany .................. 41 18 793.8

[51] Int. Cl.$^6$ .......................... G01F 23/28; B06B 1/06
[52] U.S. Cl. ..................................... 318/642; 340/621;
340/620; 310/323; 310/328; 73/290 V
[58] Field of Search ................ 318/642, 482; 340/618,
340/620, 621; 310/311, 321, 322, 323, 324, 328;
73/290 R, 290 V

[56] References Cited

U.S. PATENT DOCUMENTS 3,472,063 10/1969 Branson .
3,825,025 7/1974 Samuel et al. .
3,834,233 9/1974 Willis et al. .
4,130,018 12/1978 Adams et al. .
4,173,725 11/1979 Asai et al. .
4,499,765 2/1985 Benz et al. .
4,594,584 6/1986 Pfeiffer et al. .
4,896,536 1/1990 Benz .
5,191,316 3/1993 Dreyer .

Primary Examiner—Bentsu Ro
Attorney, Agent, or Firm—Barnes & Thornburg

[57] ABSTRACT

The device comprises at least two oscillation rods that are mounted at a distance from each other on a membrane, the edge of which are connected with a screw insert. A clamping screw is connected with the membrane on the side opposing the oscillation rods in such a rigid manner that the clamping screw and the membrane assume a position to each other in which their symmetry axes coincide. The clamping screw is surrounded by a stack of annular piezoelectric elements, electrode rings as well as insulating rings. This stack forms the excitation and reception transformer of the device. The stack-shaped excitation and reception transformer is clamped and mounted between the membrane and a hexagonal nut. The stack braces itself on a shoulder that encompasses the membrane within a distance by the metal ring that closes the stack. The clamping force is chosen such that the membrane is simultaneously prestressed in a concave manner. The excitation transformer excites the oscillation rods to perform opposite oscillations perpendicular to their longitudinal axes in their natural resonance frequency. The reception transformer detects a change in the oscillation behavior of the oscillation rods which is in turn utilized to determine and/or monitor the predetermined filling level. The alteration of the oscillation frequency as well as the alteration of the oscillation amplitude of the oscillation rods can be utilized for this purpose.

8 Claims, 2 Drawing Sheets

DEVICE FOR DETERMINING AND/OR MONITORING A PREDETERMINED FILLING LEVEL IN A CONTAINER

The invention pertains to a device to determine and/or monitor a predetermined filling level in a container with a mechanically oscillating structure that comprises at least two vibrating rods that protrude into the container and are arranged at a distance from each other on a membrane that is fixed at its edges, an excitation arrangement that effects opposite oscillations of the oscillation rods transverse to their longitudinal extent, an excitation transformer that contains at least one piezoelectric element that can be excited by an alternating voltage, and a reception transformer with at least one piezoelectric element that transforms the oscillations of the mechanically oscillating structure into an electrical output signal.

A device of this type is known from the Patent No. DE-AS 17 73 815. As compared to other known devices with a single oscillation rod that protrudes into the container, this device provides the advantage that the alternating forces that are applied by each oscillation rod, and act upon the fixing of the membrane, mutually eliminate each other due to the opposite direction of the oscillations, which means that no vibrational energy is lost by a transfer onto the container walls, and that the fixing is exposed to less mechanical stress. In this known device the ends of the oscillation rods which are connected with the membrane are also connected with each other by two bridges that are mechanically decoupled from each other, whereby each of these bridges consists of a yoke adjoining the membrane and a bar spanning the yoke. One bridge is coupled with the excitation transformer and the other bridge is coupled with the reception transformer by the fact that the piezoelectric element of the transformer is clamped between the bar and the yoke. The excitation transformer is connected to the output of an amplifier, the input of which is connected with the reception transformer, so that a self excitation of oscillations with the natural resonance frequency of the mechanically oscillating structure is executed.

The evaluation circuit that is connected to the output of the amplifier is constructed such that it responds to amplitude changes. The function of this device is based on the fact that the mechanic oscillations of the oscillation rods are damped during submersion into the material, so that a reduction of the oscillation amplitude results that is detected by the evaluating circuit and effects the triggering of a display and/or switching process.

It was established that this know device requires relatively strong damping of the oscillation rods by the material due to the construction of the mechanical oscillation structure and the arrangement of the piezoelectric transformers in order to ensure a reliable response to the amplitude changes. This device can thus be utilized to monitor materials that cause a strong damping if the oscillation rods are covered, for example, bulk materials or fluids with high viscosity.

A different device from this type with two oscillation rods that protrude into the container is known from Patent No. DE-PS 33 36 991. The device of this patent has a bridge arranged on the side of the membrane that opposes the oscillation rods and is retained at the ends within a distance from the membrane by rod-shaped supports that are connected with the oscillation rods. The piezoelectric elements of the excitation transformer and the reception transformer are in this particular device arranged in a stack which is clamped between the bridge and the portion of the membrane lying between the oscillation rods. The device of Patent No. DE-PS 33 36 991 already attained the objective to construct a device of this type with two oscillation rods that protrude into the container such that it is suitable for materials of any type, and additionally make it possible to operate the device with a low alternating, excitation voltage and low excitation energy.

A further device of the same type which also comprises two oscillation rods that protrude into the container is known from Patent No. DE-PS 39 31 453. The device of this patent has a stack of excitation and reception transformers arranged on the side of the membrane that opposes the oscillation rods, whereby the stack of excitation and reception transformers is penetrated by a clamping screw. This patent also disclosed that the excitation and reception transformers are clamped between the membrane and a hexagonal nut, whereby the membrane is fixed in a concave manner. According to a further characteristic of this patent, pressure pins are clamped between the stack of excitation and reception transformers and the membrane which are arranged on a circular ring at equal distances, whereby the symmetry axis of this circular ring coincides with the symmetry axis of the membrane. The object of Patent No. DE-PS 39 31 453 also attained the objective to construct a device of this type with two oscillation rods that protrude into the container such that it is suitable for materials of any type, and that it can be operated with a low alternating excitation voltage and a low excitation energy. One disadvantage of this device can be seen in the fact that an exact alignment of the pressure pins is required to drive the oscillation system, and that the drive can be jammed during installation.

Originating from this known device, the invention is based on the objective to create a device to determine and/or monitor a certain filling level in a container which comprises at least two oscillation rods that protrude into the container and can also be operated with a low alternating, excitation voltage and low excitation energy, and can be economically manufactured from only a few components and does not have the disadvantages according to the state of technology.

The invention furthermore provides the advantage that a higher degree of effectiveness for the drive is provided due to the full utilization of the membrane diameter. It was also established that the device according to the invention has a lower sensitivity to external vibrations.

The device according to the invention furthermore provides the advantage that the moments originating from the length change of the piezoelectric elements and act upon the membranes are amplified and thus effect an augmentation of the oscillation amplitude of the oscillation rods.

Further advantages of the invention result from the following description of one application example illustrated in the figures. The figures show:

FIG. 1: a partial longitudinal section through the device, and

Figure 2:
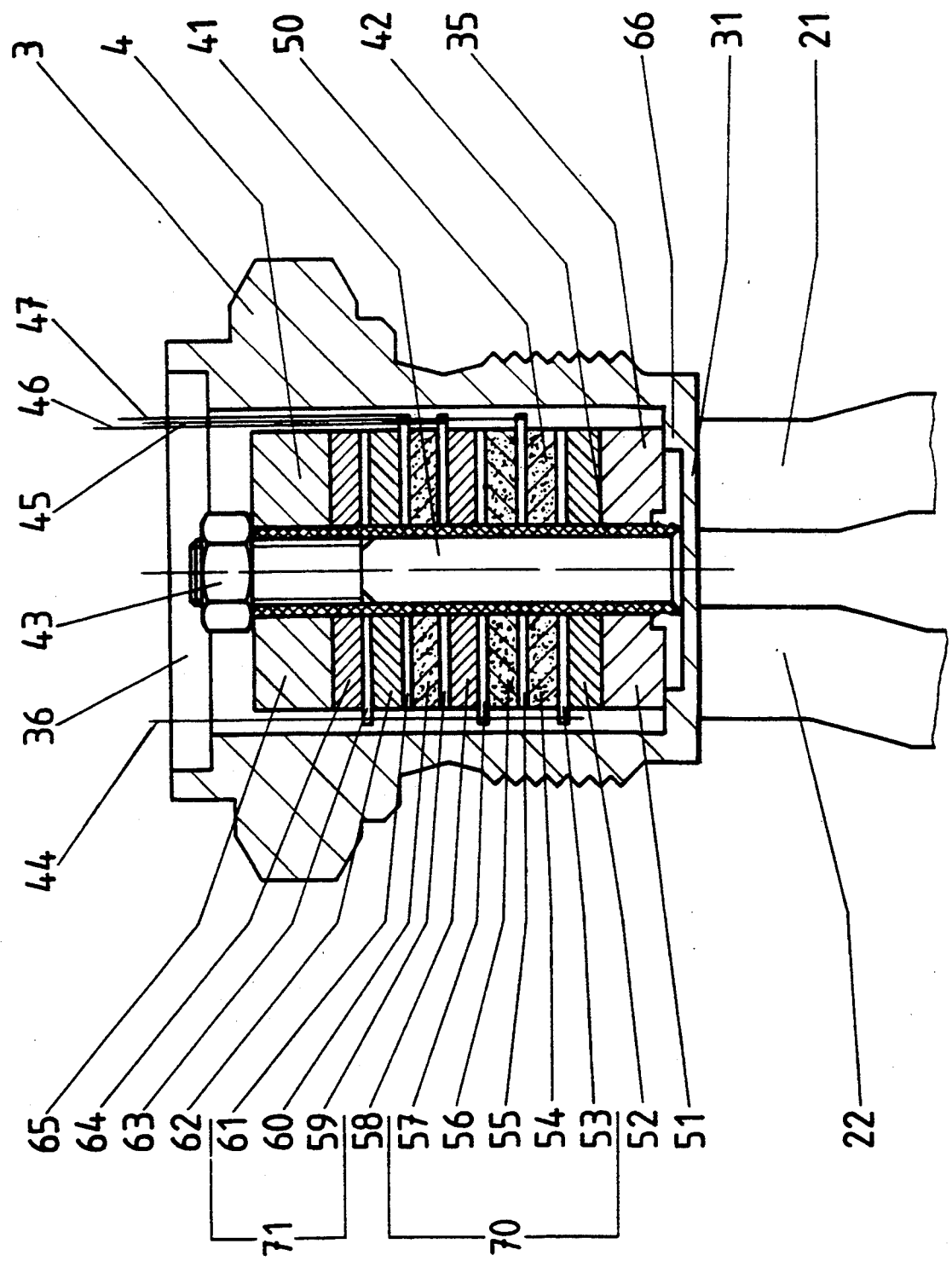

FIG. 2: an enlarged longitudinal section through the screw insert of the device according to the invention illustrated in FIG. 1.

FIG. 1 shows a device to determine and/or monitor a predetermined filling level which is marked with reference number (1). It comprises oscillation rods (21,22), the screw insert (3), and the excitation and reception transformer (4). The oscillation rods (21,22) protrude into the interior of a container which is not shown, the filling level of which is to be determined or monitored by means of the device (1). The oscillation rods have the same shape and are arranged opposite each other and rotated by 180° around their longitudinal axes. Both oscillation rods are firmly connected with the membrane (31) on the side that opposes the interior of the container, whereby the membrane closes the interior of the screw insert (3) towards the inner space of the container. Each of the oscillation rods (21,22) are provided with a right-angled bend (23,24), so that the main portions of the oscillation rods which essentially lie parallel to each other are at a larger distance from each other than the ends connected to the membrane. The right-angled bends (23,24) cause residual longitudinal oscillations transmitted by the membrane (31) to also transform into oscillations that are transversely directed with respect to the oscillation rods. The main portions of the oscillation rods have a round cross section and are provided with a tip on their free ends. The right-angled sections (23,24) widen to form a larger noncircular cross section at the connecting point with the membrane (31).

A paddle (25) is arranged perpendicular to the plane that contains the axes of the oscillation rods on the free end of each oscillation rod (21,22). Each of the paddles (25) extends from the free end of the oscillation rod over a relatively long distance that amounts to between 40 and 60% of this length. However, the width of each paddle, perpendicular to the longitudinal axis of the oscillation rod, is substantially smaller than the longitudinal extent. This width of the paddles (25) and the right-angled bends (23,24) are adapted to each other such that the oscillation rods (21,22), together with the paddles (25) attached to the same, can be guided through an opening arranged in the container wall which is not shown. Despite the relatively small width of the paddles (25), a large effective paddle surface results due to the large longitudinal extent to the paddles.

The screw insert (3) has a cylindrical shape and is provided with a cylindrical outer thread (32) by means of which the device (1) is mounted into the not shown wall of the container, the filling level of which is to be determined and/or monitored. A bore that is provided with a cylindrical inner thread penetrates through the container wall for this purpose. To screw the device (1) into the container wall, a hexagon (33) is formed on the screw insert (3), whereby the surface distance of the hexagon corresponds with the dimension of a wrench. The pressure-tight closing of the container is ensured by an annular sealing surface (34) and is performed by inserting a not shown annular gasket. The interior of the screw insert (3) penetrates a cylindrical hollow space (35) on the side opposing the oscillation rods (21,22), whereby the axial extent of the cylindrical hollow space is chosen such that only a minute portion of the screw insert (3) which forms the membrane (31) of the device (1) is not penetrated. The excitation and reception transformer (4) is arranged within the cylindrical hollow space (35) of the screw insert (3).

The oscillation rods (21,22), the paddles (25), the screw insert (3), and the membrane (31) are preferably manufactured in one piece as a metallic element.

The installation of the device (1) can of course be executed at any arbitrary point of the container, such as in the wall or in the lid, depending on how the measuring and/or monitoring of the filling level should be executed.

The structure of the excitation and reception transformer (4) is shown in FIG. 2. It comprises the clamping screw (41) which is firmly connected with the membrane (31). This connection can be executed by any measure known to the expert, for example, by welding, bonding and so forth. The clamping screw (41) can also represent part of the one-piece mechanical element as the screw insert (3), including the oscillation rods (21,22), is preferably manufactured.

The clamping screw (41) is arranged on the membrane (31) such that its symmetry axis coincides with the one of the membrane (31), and that the clamping screw protrudes into the cylindrical hollow space (35). The excitation and reception transformer (4) furthermore comprises the insulated pipe (42), the hexagonal nut (43), the connecting lines (44,45,46,47) as well as the piezo[electric] stack (50) with the following components:

Metal ring (51)
Insulating ring (52)
Electrode ring (53)
Annular piezoelectric element (54)
Electrode ring (55)
Annular piezoelectric element (56)
Electrode ring (57)
Insulating ring (58)
Electrode ring (59)
Annular piezoelectric element (60)
Electrode ring (61)
Insulating ring (62)
Electrode ring (63)
Insulating ring (64)
Metal ring (65)

The electrode rings (53,55,57) as well as the annular piezoelectric elements (54,56) form the excitation transformer (70), and the electrode rings (59 and 61) as well as the piezoelectric element (60) form the reception transformer (71) of the excitation and reception transformer (4). The insulating pipe (42) forms the electric insulation of the clamping screw (41) against the components of the piezo stack (50).

All components of the piezo stack in the shown example preferably have the same annular cross section, so that the transformer column has a cylindrical shape and is guided by the clamping screw (41).

A soldering tag that protrudes from the piezo stack (50) is formed on each of the electrodes. The metal rings (51,65) preferably consist of brass and serve on one hand as spacers to obtain the required length of the piezo stack (50) between the membrane (31) and the hexagonal nut (43), and, on the other hand, to transfer the forces onto the remaining components of the stack. The main function of the metal rings (51,65) consists of the fact that the surface pressure produced by the hexagonal nut is transferred uniformly onto the piezoelectric elements (54,55,60) in order to prevent a bending of the piezoelectric elements which are very susceptible to fractures. The metal ring (51) causes the bending of the membrane (31) to originate from the prestress and the oscillations is not transferred onto the piezoelectric elements (54,56,60). This measure also prevents the piezoelectric elements, which are susceptible to fractures, from being exposed to any bending stress.

The inner circular surface of the membrane (31) does not extend radially up to the outer surface of the hollow space (35), but has a small diameter. A short cylindrical recess extending in the direction opposite the oscillation rods (21,22) is arranged on the inner side of the membrane (31). The outer surface of this cylindrical recess coincides with the peripheral surface of the inner side of the membrane and forms a shoulder (66) due to the difference in the diameter as compared to the hollow space (35). The shoulder (66) has a circular, cylindrical cross section and its peripheral line coincides with the outer surface of the hollow space (35).

The shoulder (66) has the purpose to transfer the length changes of the piezoelectric elements (64,56) originating from the excitation transfer (70) onto the membrane (31). The metal ring (51) is for this purpose braced on an annular surface of the shoulder (66).

The prestress of the membrane (31) produced with the aid of the hexagonal nut (53) is, according to the invention, also transferred onto the annular surface of the shoulder (66) and thus the membrane (31) by the braced annular surface of the metal ring (51).

A not shown electronic head is arranged in an axial continuation of the screw insert (3) on the side that opposes the oscillation rods (21,22). The electronic head contains the electronic circuit of the device (1) and is surrounded by a housing. The cylindrical recess (36) which extends in the axial direction over a certain distance on the side opposing the oscillation rods and has a larger diameter than the hollow space (35) serves as the receptacle for the housing of the electronic head. The not shown electronic circuit is electrically connected with the excitation and reception transformer (4) with the connecting lines (44,45,46,47).

The excitation transformer (70) has the purpose of transforming the alternating voltage delivered by the electrical circuit through the connecting lines (44,45) into mechanical oscillations of the oscillation rods (21,22). Both electrodes (53,57) are connected to one pole of the alternating voltage source, preferably the ground, and the electrode (55) is connected to the other pole of the alternating voltage source. The piezoelectric elements (54,56) are thus switched to be electrically parallel and mechanically in series. Due to the applied alternating voltage, each of the piezoelectric elements (54,56) is exposed to a deformation (change in thickness) in the axial direction of the piezo stack (50) which is proportional to the applied voltage.

The mechanical deformations of the piezoelectric elements (54,56) add themselves, so that the length change of the piezo stack (50) is doubled for any given intensity of the applied alternating voltage.

The reception transformer (71) has the purpose to transform the mechanical oscillations of the oscillation rods (21,22) and the membrane (31) into an electric output signal that is transmitted to the electronic circuit by the connecting lines (46,47). The electrode (63) is connected to the ground and serves the purpose of shielding the reception transformer (71). The fact that the adjacent electrode (57) of the excitation transformer (70) is connected to the ground and thus simultaneously serves as the shielding electrode on this side of the reception transformer (71) is utilized to shield the reception transformer (71) on the other side.

The function of the excitation and reception transformer (4) is described as follows. Due to the prestress, produced by the clamping screw (41) and the hexagonal nut (43) via the piezo stack (50), and the metal rings (51) onto the shoulder (66) and thus the membrane (31), the membrane (31) is bent in a concave manner which in turn means that the oscillation rods (21,22) are directed towards the inside. The prestress force is thus only received elastically by the membrane (31), and the spring effect of the membrane (31) also compensates different thermal expansions.

If the piezo stack (50) is enlarged as compared to its neutral condition due to the alternating voltage applied to the excitation transformer (70), the prestressed membrane (31) is further bent in a concave manner which in turn directs the oscillation rods (21,22) further towards the inside. However, if the length of the piezo stack (50) is shortened as compared to its length in the other half period of the alternating current, the oscillation rods (21,22) can oscillate towards the outside, while the bending of the membrane is at first reduced, and then transforms into an opposite bending depending on the adjusted prestress.

The bending is actually very small and can, for example, lie in the range of a few μm.

An expert can easily detect that the effect of the excitation transformer (70) in the piezo stack (50) exposes the oscillation rods (21,22) into opposite oscillations transverse to their longitudinal axes that lie in collective planes. The shown structure and dimensions of the components results in a sufficient transfer effect, so that the deformation of the piezoelectric elements (54,56) required to obtain a sufficient oscillation amplitude is very small. Due to the opposite direction of the oscillations, the alternating forces, to which the prestress of the membrane (31) is exposed by each of the oscillation rods (21,22), mutually eliminate each other, so that no vibrational energy is lost by a transfer to the screw insert (3) and the not shown container wall.

The return spring of the mechanical oscillation system formed by the oscillation rods (21,22) and the membrane (31) is formed by the membrane (31). The mass of the mechanical oscillation system consists, on one hand, of the mass of the oscillation rods (21,22), and, on the other hand, of the mass of the surrounding medium carried by the oscillation rods during the oscillating motion. This carried mass is enlarged by the paddles (25) arranged perpendicular to the direction of oscillation. The natural resonance frequency of the mechanical oscillation system depend, on one hand, on the spring constant of the spring system which can be assumed to be constant and, on the other hand, on the total mass that can be altered in dependence of the carried mass. If the oscillation rods (21,22) with their paddles (25) are located in air, the carried mass of the air can be neglected, and a natural resonance frequency that is essentially determined by the mass of the oscillation rods (21,22) and the thickness of the membrane (31) adjusts itself. However, if the oscillation rods (21,22) have their paddles (25) submerged in a material, the carried mass and thus the natural resonance frequency of the mechanical oscillation system is altered. The shown shape of the paddles (25) results in an optimal effect in consideration of the limitation of the width determined by the threaded bore in the container wall. It was established that a surface enlargement of the oscillation rod obtained by further elongation of the paddles (25) by more than 60% does not result in a substantial improvement with regard to the alteration of the frequency.

The excitation of the oscillations of the mechanical oscillation system is always executed with its natural resonance frequency, even if the same changes. According to a conventional process, this is executed by the fact that the mechanical oscillation system itself serves as the element of an electrical oscillation generator that determines the frequency. Both electrodes (59,61) of the reception transformer (71) are for this purpose connected with the input of a not shown amplifier, the output terminals of which are connected to the electrodes (53,57) on one hand and the electrode (55) of the excitation transformer (70) on the other hand. Thus, the frequency of the alternating voltage applied to the excitation transformer (70) always follows the natural resonance frequency of the mechanical oscillation system.

It was established that a defined alteration of the natural resonance frequency results with the described structure of the oscillation system (21,22,31) and the excitation and reception transformer (4) with very minute alterations of the carried mass. This defined alteration of the natural resonance frequency also occurs at higher oscillation amplitudes of the oscillation rods (21,22) caused by the concave prestress of the membrane (31).

The device to trigger display and/or switching processes which is not shown in the figure and controlled in dependence on the output signal of the reception transformer (71) is preferably constructed such that it responds to frequency changes. However, it is also possible to design the device such that it is controlled by the output signal of the reception transformer such that it responds to amplitude changes of the oscillation rods (21,22). Independent from the evaluation of the frequency or amplitude changes, a relatively small alternating voltage suffices to drive the excitation transformer. It was established that an excitation voltage of 10 V suffices to obtain the response sensitivity in the described device. The low response voltage is particularly advantageous with applications in areas where the danger of explosions exist.

In addition to the low response voltage and the larger oscillation amplitude of the oscillation rods (21,22) caused by the concave prestress of the membrane (31), the low required response efficiency simplifies and economizes the structure of the electronic circuit and thus represents an additional advantage. It is even possible to very exactly adjust the response point. Thus, the device makes it possible to detect the transition between air and a foam or between a foam and a liquid.

I claim:

1. Device to determine and/or monitor a predetermined filling level in a container with a mechanically oscillating structure that comprises at least two oscillation rods that protrude into the container and are attached at a distance from each other to a membrane that is clamped at its edges and formed by the area of a screw insert that is not penetrated by a hollow space, with an excitation transducer and a receiving transducer that are closed on both ends by metal rings and arranged in a stack of piezoelectric elements, said stack including one or more piezoelectric elements that can be excited by an ac voltage in order to cause the oscillation rods to perform opposite oscillations perpendicular to their longitudinal axis, and said stack also including one or more piezoelectric elements to receive and transform the oscillations of the mechanically oscillating structure into an electric output signal, and with one clamping screw that is firmly connected with the membrane on the side of said membrane that opposes the oscillation rods and penetrates the excitation and receiving transducer characterized by the following property:

a shoulder (66) is formed onto the side of the membrane (31) that opposes the oscillation rods (21,22), whereby the shoulder extends radially around the inner circular surface of the membrane (31) and braces itself on the excitation and receiving transducer (4) with an annular surface of a metal ring (51) and thus transfers the linear deformation of the piezoelectric elements (64,56) originating from the excitation transducer (70) to the membrane (31).

2. Device according to claim 1, characterized by the fact that the shoulder (66) has an annular shape.

3. Device according to claim 1, characterized by the fact that the shoulder (66) is formed by the surface area extending around the membrane (31) on the side opposing the oscillation rods (21,22) and the base of the hollow space (35) of the screw insert (3) extending in the radial direction from the membrane (31).

4. Device according to claim 1, characterized by the fact that the shoulder (66) extends in the radial direction within a minute distance from the membrane (31) at an angle of 90° to the axis of symmetry of the screw insert (3).

5. Device according to claim 1, characterized by the fact that the excitation transducer and the receiving transducer (4) consist of a stack (50) of annular piezoelectric elements (54,56,60), electrode rings (53,55,57,59,61,63), insulating rings (52,58,62,64), metal rings (51,65) as well as the clamping screw (41).

6. Device according to claims 1 or 5, characterized by the fact that the excitation transducer (70) contains two annular piezoelectric elements (54,56) that are electrically connected in parallel and mechanically connected in series.

7. Device according to claims 1 or 5, characterized by the fact that the metal ring (51) is arranged on the end of the piezo stack (50) that faces the membrane (31).

8. Device according to claim 1, characterized by the fact that the membrane (31) is prestressed in a concave manner and adjusted by the tightening or loosening of a hexagonal nut (43) on the clamping screw (41) with simultaneous alignment and fastening of the piezo stack (50).

* * * * *